United States Patent Office 3,090,403
Patented May 21, 1963

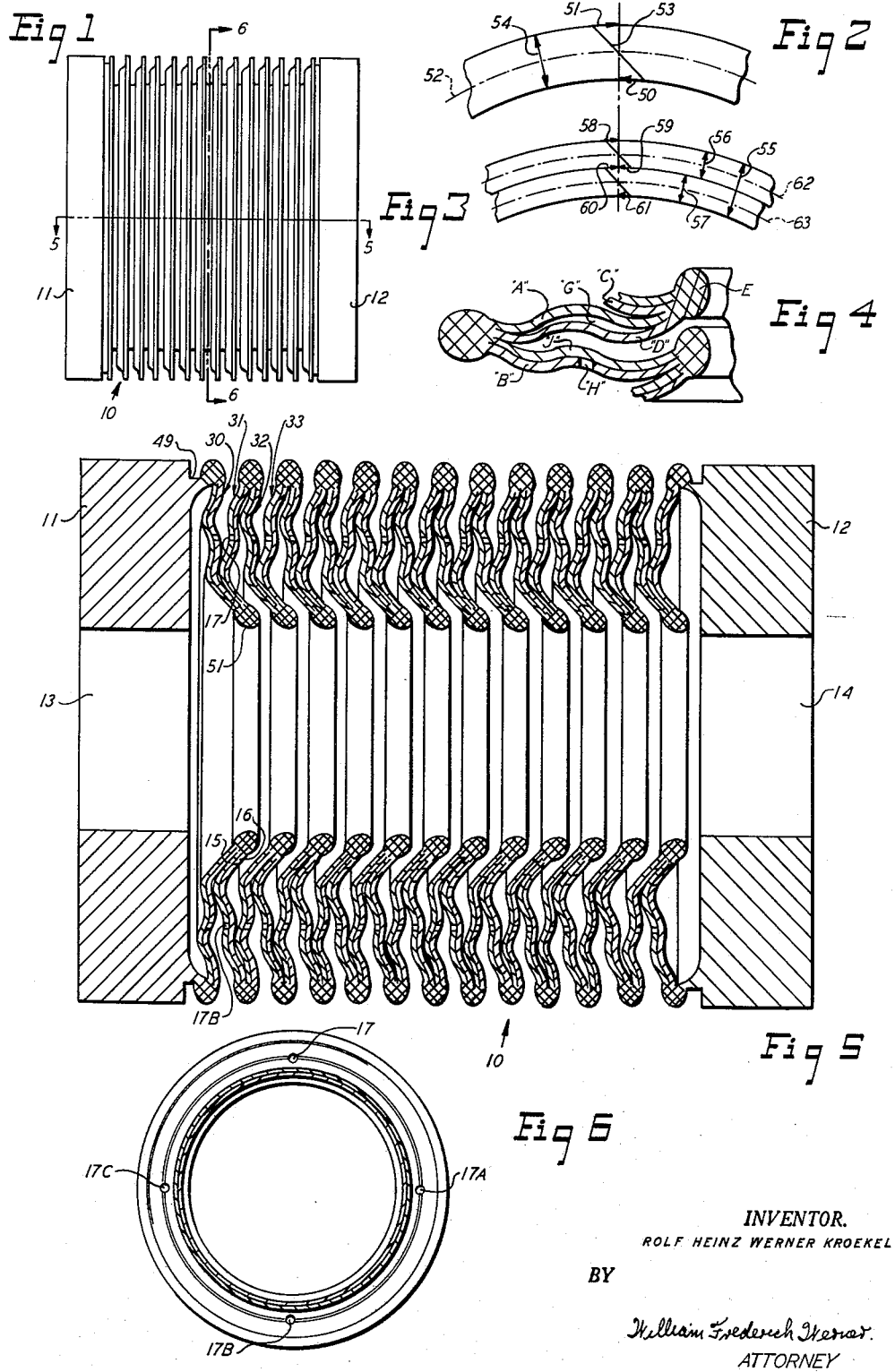

3,090,403
LAMINATED METALLIC BELLOWS
Rolf Heinz Werner Kroekel, West Greenwich, R.I., assignor to Sealol, Inc., Warwick, R.I., a corporation of Delaware
Filed Feb. 9, 1962, Ser. No. 172,294
3 Claims. (Cl. 137—793)

This invention relates to metallic bellows and more particularly to a laminated metallic bellows which consists of a number of discs, usually annular with central bores and suitably shaped in order that two discs may be jointed on the outer edges to each other and to two adjacent discs on one side and on the inner or central bore edges to each other and to two adjacent discs on the opposite side.

An object of the present invention is to provide a metallic bellows with laminated diaphragms which are fastened together on the outer edges and inner central bore edges with the intermediate areas engaging each other without being secured together.

Another object of the present invention is to provide a metallic bellows with diaphragms which can withstand pressure forces, either internally or externally, ranging from two thousand pounds per square inch to ten thousand pounds per square inch.

Still another object of the present invention is to provide means which permit the lamination of two thin metallic disks which form the diaphragm of a bellows.

Other objects of the present invention will become apparent in part and be pointed out in part in the following specification and claims.

In the past it has been common practice to increase the thickness of the wall of a diaphragm when the bellows was to be used with increased pressure. It was soon discovered that metallic bellows were extremely limited in the amount of dynamic pressure which could be applied to the bellows.

It was believed to be a common expedient to laminate two disks of thin metal together to form the individual diaphragms of the bellows. It was soon discovered that such diaphragms ruptured at pressures far below those pressures desired as working pressures.

The next step in the evolution of solving the problem of providing bellows which could function in high pressure atmospheres was to vacuum heat treat the laminated diaphragms. This step did not solve the problem.

It is therefore an object of the present invention to provide a means whereby the individual diaphragms of a bellows will function in high pressure atmospheres.

Referring to the drawings in which similar characters of reference indicate corresponding parts in all the figures:

FIGURE 1 is a side elevational view of the new and improved laminated metallic bellows.

FIGURE 2 is a diagrammatic view illustrating one thickness of metal under stress.

FIGURE 3 is a view similar to FIGURE 2 illustrating two layers of metal having the combined thickness of the metal shown in FIGURE 2.

FIGURE 4 is a schematic cross sectional view of two diaphragms of a metallic bellows.

FIGURE 5 is a horizontal cross sectional view taken on line 5—5 of FIGURE 1.

FIGURE 6 is a vertical cross sectional view taken on line 6—6 of FIGURE 1.

In proceeding with this invention there is provided a flange 11 and a flange 12. These flanges are provided with axial passageways or central bores 13, 14, respectively. Between the flanges a plurality of diaphragms, generally indicated by reference numeral 10, are arranged so that the flanges 11, 12 are connected by a fluid-tight casing which will permit the flanges 11, 12 to move longitudinally with respect to each other with flexing of the diaphragms.

As illustrated in the drawing, the several diaphragms 10 are alike in size and shape being stamped or forged out of suitable sheet metal. Each diaphragm generally indicated by reference numerals 30, 31, 32, 33, etc., is an annular disc having a central bore approximately equal in diameter to the diameter of central bores 13, 14. Each diaphragm, 31 for example, comprises two discs 15, 16 of uniform thickness. For example, in a bellows having a central aperture or bore 2½ inches in diameter and an outside diameter of 3¾ inches, sheet metal of .004 of an inch in thickness may be used. One of the discs, 15 for example, will be provided with one or more vents or apertures 17, 17B. See for example, FIGURE 4, which illustrates four apertures 17, 17A, 17B and 17C. These apertures may be .020 of an inch in diameter or they may be smaller in diameter because they serve the function of a vent or hole.

It will be noted that diaphragms 30, 31, 32, 33, etc., form the side of the laminae exposed to the atmosphere in the bellows illustrated in FIGURE 5 and the diaphragm 16, for example, is exposed to the pressure (gas or liquid) passing through bellows 10.

In this illustration the vents or apertures 17, 17B, etc., must be in the diaphragm exposed to the atmosphere as contrasted to the diaphragm exposed to fluid pressure.

If through inadvertence, accident or mistake the vent 17 is placed in the diaphragm exposed to the greater of two pressures, then such pressure passing through the vent will cause the laminae 15, 16 to separate and defeat the principal object of the present invention, namely, the support and reinforcing of one lamina by another lamina in an area where the laminae are not fastened together.

If the vents 17, 17A, etc., are not provided, a gas pocket will be present between the laminae 15, 16. Welding the internal diameter edges after the external edges have been welded, or vice versa, will cause the gas to expand and deform by separating the two laminae making the support of one lamina by the adjacent lamina impossible. The laminae are thereby rendered inflexible. Without diaphragm flexibility there can be no bellows.

It will, of course, be understood that the number of diaphragms may be extended to provide a longer bellows, if desired, beyond the number of diaphragms illustrated in FIGURE 5.

Ordinarily the assembly will start at one end and progress joint by joint to the other end, although the procedure may be varied as will be later indicated. In any event a suitable assembly jig or fixture will be required to hold the discs in place by engagement with the central bore or aperture while the outer edges are being welded and by engagement with the outer edge while the inner edges at the central bore are being welded. The first step is to place the flange 11 in a jig, then place the two discs 15, 16 making the first diaphragm 30 therein and weld the outer margins of these two discs 15, 16 together and to the outer periphery of flange 11 at 49. The next step is to place the flange and attached diaphragm in another jig, move the two discs 15, 16 of the next diaphragm 31 into place and weld together the inner margins of diaphragms 30, 31 at 51 which comprise four thicknesses of metal.

The assembly of the entire bellows may be carried out by repeating in alternation the steps just described in a manner which will be readily understood without further explanation. If desired the procedure may be varied by assembling one-half of the bellows as above described, then assembling the other half and finally joining two halves by welding together the other edges of the diaphragms which form the central or medial diaphragm.

There is now provided a bellows having diaphragm elements comprising two discs of .004 inch thickness and welded together on opposite ends. This structure provides exceptional strength. Referring to FIGURE 2 wherein a single thickness of metal under stress is illustrated. Reference numeral 50 represents the compression in the direction of the arrow. Reference numeral 51 represents the tension in the direction of the arrow. Dot and dash line 52 is the centerline of the thickness of a metal disc. Line 53 indicates the deviation through the metal thickness from zero at the intersection of line 53 and line 52 to elastic stretch of the metal at 50 and 51. Reference numeral 54 represents the thickness of metal disc 15.

FIGURE 3 represents a laminated diaphragm consisting of two thicknesses 56, 57 of metal equal in thickness 55 to thickness 54. It will be observed that compression graphs 59, 61 are equal to one half the length of compression graph line 50. Likewise, tension graphs 58, 60 are equal to one half the length of tension graph line 51. Line 62 is the centerline of diaphragm 15 and line 63 is the centerline 16. Thus it will be graphically observed the stress on two pieces of metal laminated is one half the stress on each lamina when compared to a single thickness of metal having a thickness of two laminated pieces of metal under the same load.

When two laminae are welded together they become one and react to stress in the same manner and degree as if they were constructed of a single thickness.

In providing two separate laminae the stress is divided equally between them. The laminae under stress will move at different degrees. The level of stress is reduced due to the relative motion between laminae.

In FIGURE 4 there is represented a fragmentary sectional view through a metallic bellows. Diaphragm A illustrates what happens to two discs C and D laminated together on their opposite ends at E, F when subjected to heat treatment. A gas pocket develops at G so that disc C does not "back up" or reinforce disc D. Each disc standing alone has about one half the strength of a disc twice as thick. However, if a very small orifice H is provided in a disc such as disc B then a companion disc J will abut disc B thereby reinforcing disc B and provide a laminated disc having a strength far greater than the strength of a single thickness equal to the thickness of B plus J.

FIGURE 6 illustrates a plurality of four orifices 17, 17A, 17B, 17C for permitting entrapped gas between discs 15, 16 to escape during the heat treating process. Thereby providing laminated discs having a strength greater than the strength of a single thickness of metal which would be equal to the thickness of the two laminated discs. In this way a laminated bellows is provided which can withstand pressures greater than was heretofore possible without sacrificing the flexibility of the bellows. Obviously a disc of a given thickness does not have the flexibility of a disc of half that thickness all other conditions being equal. The fastening of two discs or laminae on opposite ends sacrifices very little flexibility while providing greater resistance to rupture at any given pressure.

Having shown and described a preferred embodiment of the present invention by way of example, it should be realized that structural changes could be made and other examples given without departing from either the spirit or scope of this invention.

What I claim is:

1. A metallic bellows structure adapted to connect two relatively movable parts to form a flexible and expansible joint therebetween, said bellows structure consisting of a plurality of diaphragms, each diaphragm comprising two layers of flexible metal, having a central bore, one of said layers having a gas escape orifice exposed to the atmosphere, said diaphragms being welded to each other and to the adjacent diaphragms on one side thereof at the outer margins and to each other and to adjacent diaphragms on the opposite side thereof at the inner margins at the central bore.

2. A metallic bellows structure adapted to connect two relatively movable parts to form a flexible and expansible joint therebetween, said bellows structure consisting of a plurality of diaphragms, each diaphragm comprising two layers of annular discs of like shape, like size, and like flexible metal, provided with central bores, one of said layers having a plurality of gas escape orifices exposed to the lowest pressure acting on said bellows, said diaphragms being welded to each other and to the adjacent diaphragms on one side thereof at the outer margins and to each other and to adjacent diaphragms on the opposite side thereof at the inner margins at the central bore.

3. A metallic bellows structure adapted to connect two relatively movable parts to form a flexible and expansible fluid tight joint therebetween, said bellows structure consisting of a plurality of diaphragms, each diaphragm comprising two laminated layers of annular discs of like shape, like size and of equal gauge of flexible metal and provided with a central bore, one of said laminated layers having a gas escape orifice exposed to the atmosphere, said diaphragms being welded to the adjacent diaphragm on one side thereof at the outer margins and to adjacent diaphragms on the opposite side thereof at the inner margins of the central bore.

References Cited in the file of this patent

UNITED STATES PATENTS

| | | |
|---|---|---|
| 2,389,720 | Drane | Nov. 27, 1945 |
| 2,657,074 | Schwester et al. | Oct. 27, 1953 |
| 2,657,075 | Schwester | Oct. 27, 1953 |
| 2,797,112 | Ziebold | June 25, 1957 |

FOREIGN PATENTS

| | | |
|---|---|---|
| 181,152 | Germany | Feb. 25, 1955 |
| 730,858 | Great Britain | June 1, 1955 |